(12) United States Patent
Rastogi et al.

(10) Patent No.: US 7,948,340 B2
(45) Date of Patent: May 24, 2011

(54) THREE-PHASE MULTI-WINDING DEVICE

(75) Inventors: Mukul Rastogi, Murrysville, PA (US); Richard H. Osman, Pittsburgh, PA (US); Peter Willard Hammond, Greensburg, PA (US); Marc F. Aiello, Oakmont, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/200,377

(22) Filed: Aug. 28, 2008

(65) Prior Publication Data

US 2009/0058584 A1   Mar. 5, 2009

Related U.S. Application Data

(60) Provisional application No. 60/968,577, filed on Aug. 29, 2007, provisional application No. 60/968,584, filed on Aug. 29, 2007, provisional application No. 60/968,610, filed on Aug. 29, 2007.

(51) Int. Cl.
*H01F 30/12* (2006.01)
*H01F 27/02* (2006.01)
*H01F 21/02* (2006.01)
*H01F 27/28* (2006.01)
*H01F 27/24* (2006.01)
*H01F 7/06* (2006.01)

(52) U.S. Cl. ............... 336/5; 336/83; 336/145; 336/170; 336/221; 336/222; 29/602.1; 29/605

(58) Field of Classification Search .................. None
See application file for complete search history.

(56) References Cited

U.S. PATENT DOCUMENTS

| 1,716,553 | A | * | 6/1929 | Higbee .......................... 336/133 |
| 2,406,704 | A | * | 8/1946 | Mossay et al. ..................... 336/5 |
| 2,422,591 | A | * | 6/1947 | Sigmund et al. ................ 310/88 |
| 2,790,131 | A | | 4/1957 | Nyssonen |
| 2,870,422 | A | * | 1/1959 | Gindes et al. ..................... 336/30 |
| 3,711,762 | A | * | 1/1973 | Eckenfelder et al. ......... 363/154 |
| 3,743,989 | A | * | 7/1973 | Nicolas et al. ..................... 336/5 |
| 4,320,645 | A | | 3/1982 | Stanley |
| 5,001,585 | A | * | 3/1991 | Schalk ........................ 360/281.5 |
| 5,317,299 | A | * | 5/1994 | Dhyanchand et al. ............ 336/5 |
| 5,625,545 | A | | 4/1997 | Hammond |
| 5,634,258 | A | * | 6/1997 | Onodera et al. ................ 29/598 |
| 5,638,263 | A | | 6/1997 | Opal et al. |
| 5,986,909 | A | | 11/1999 | Hammond et al. |
| 6,222,284 | B1 | | 4/2001 | Hammond et al. |

(Continued)

FOREIGN PATENT DOCUMENTS

DE   19604192 A1   5/1996

(Continued)

*Primary Examiner* — Anh T Mai
*Assistant Examiner* — Mangtin Lian
(74) *Attorney, Agent, or Firm* — Filip A. Kowalewski

(57) ABSTRACT

A three-phase, multi-winding includes a core, the core including a hub and an outer shell around a perimeter of the hub. wherein the hub and the outer shell are in a fixed position with respect to each other. The core also includes multiple slots. In addition to the core, the multi-winding device includes a primary winding positioned in at least two of the slots; and multiple spatially distributed secondary windings, wherein at least one of the secondary windings is positioned proximate the primary winding in at least one of the two slots.

19 Claims, 11 Drawing Sheets

U.S. PATENT DOCUMENTS

| | | |
|---|---|---|
| 6,236,580 B1 | 5/2001 | Aiello et al. |
| 6,335,582 B1 * | 1/2002 | Abukawa et al. ............. 310/214 |
| 6,909,352 B2 * | 6/2005 | Hobson et al. ................ 336/178 |
| 2002/0066174 A1 * | 6/2002 | Kanai et al. ..................... 29/596 |
| 2007/0048574 A1 | 3/2007 | Aiello et al. |
| 2007/0145959 A1 * | 6/2007 | Hyun ............................ 323/250 |

FOREIGN PATENT DOCUMENTS

| | | |
|---|---|---|
| EP | 0540750 | 5/1993 |
| GB | 131026 | 8/1919 |
| GB | 1254425 | 11/1971 |

* cited by examiner

THREE-PHASE MULTI-WINDING DEVICE

RELATED APPLICATIONS AND CLAIM OF PRIORITY

This application claims the priority benefit of U.S. Provisional Application No. 60/968,577 filed Aug. 29, 2007, U.S. Provisional Application No. 60/968,584 filed Aug. 29, 2007, and U.S. Provisional Application No. 60/968,610 filed Aug. 29, 2007, each of which are hereby incorporated by reference.

Not Applicable

BACKGROUND

This application discloses an invention that is related, generally and in various embodiments, to a compact three-phase multi-winding device.

For many years, three-phase transformers have generally been constructed with three coils of copper or aluminum windings which are installed on a laminated steel core having three legs. However, the conventional three-legged core design is not necessarily the optimal design in all cases. For example, due to the relatively large amount of space required for the conventional three-legged core design, the design is not necessarily the optimal design in many applications.

For applications where a conventional three-legged transformer requires a large number of three-phase secondary windings, each having specific voltages and phase angles, the secondary windings generally require two component windings from each coil (i.e., a total of six component windings from all three coils). For such applications, the secondary windings can be constructed, for example, in extended-delta, zig-zag, or polygon configurations. Since the number of turns in all components of any winding should be an integer, it is generally not possible to provide the specified voltage and/or phase angle exactly, and approximations are generally necessary. In the particular case when the secondary windings have the same nominal voltages, but different nominal phase angles with uniform spacing, the limited choices of integer turn numbers that can approximate the phase angles in the component windings may force secondary windings having different phase angles to have different voltages. Another problem with conventional three-legged transformers is the secondary windings will have different coefficients of coupling to the primary winding.

In general, the difficulty in physically implementing the approximations tends to increase the relative cost of the transformer, and the errors attending such approximations tend to degrade the harmonic cancellation within the transformer.

FIG. 1 illustrates an AC drive 1 which includes a conventional three-phase transformer 3. The transformer includes a primary winding 5 and a plurality of three-phase secondary windings 7, with each winding having specific voltages and phase angles. On the output side of AC drive 1, each of the three phases of the AC motor is driven by a string of power cells connected in series. In the AC drive of FIG. 1, there are six power cells per phase, labeled A1 through A6, B1 through B6, and C1 through C6, for a total of 18 power cells. It is appreciated that in other implementations, other numbers of cells per phase are possible (e.g., one cell, three cells, nine cells, etc.). In the context of an AC drive or an AC power supply, each power cell is a device which accepts three-phase AC input power, outputs a single-phase AC voltage, and includes an AC-DC rectifier (which may be regenerative), a smoothing filter, and an output DC-to-AC converter.

In the AC drive of FIG. 1, the transformer 3 receives three-phase AC input power from the local plant, at the points labeled R, S, and T on its primary winding 5. Each power cell receives three-phase AC input power from a dedicated secondary winding 7 of the transformer 3. The eighteen secondary windings 7 have the same nominal voltage, and are arranged in ranks of three, with each rank having one of six specific nominal phase angles. The nominal phase angles, which differ by multiples of ten degrees, are approximated using an extended-delta configuration and are referenced in FIG. 1 to the average phase angle of all the secondary windings. The different phase angles operate to cause harmonic cancellation within the transformer. Each secondary winding 7 contains six component windings, namely three inner delta component windings and three outer extension component windings. The component windings should all have integer numbers of turns, and the turn numbers or the inter-connections thereof are different for each phase angle.

The secondary winding component coils that are coupled to a given primary group of coils are vertically displaced around that primary coil with respect to each other. Because the various secondary component windings have different axial locations along the coils, they have different coupling coefficients to the primary winding 5. This tends to further degrade the harmonic cancellation in addition to the degradation caused by errors in voltage and phase-angle due to the requirement for integral turn numbers. Finally, as there is a relatively large amount of space which is unused in the construction of the conventional transformer 3, the overall size of the conventional transformer is relatively large.

SUMMARY

In one general respect, this application discloses a three-phase, multi-winding device. According to various embodiments, the multi-winding device includes a core, the core including a hub and an outer shell around a perimeter of the hub, wherein the hub and the outer shell are in a fixed position with respect to each other. The core also includes multiple slots. In addition to the core, the multi-winding device includes a primary winding positioned in at least two of the slots; and multiple spatially distributed secondary windings, wherein at least one of the secondary windings is positioned proximate the primary winding in at least one of the two slots.

In another general respect, this application discloses a method for generating AC voltages at specified phase angles. According to various embodiments, the method includes applying a first AC voltage to a stationary primary winding of a three-phase multi-winding device, passing an AC current through the primary winding, generating a radial magnetic field which rotates around an axis of symmetry defined by a core of the three-phase multi-winding device, and inducing a second AC voltage in a plurality of stationary spatially distributed secondary windings of the three-phase multi-winding device.

In another general respect, this application discloses an apparatus. According to various embodiments, the apparatus includes multiple power cells and a multi-winding device connected to each of the power cells. As before, the multi-winding device includes a core, the core including a hub and an outer shell around a perimeter of the hub, wherein the hub and the outer shell are in a fixed position with respect to each other. The core also includes multiple slots. In addition to the core, the multi-winding device includes a primary winding positioned in at least two of the slots; and multiple spatially distributed secondary windings, wherein at least one of the secondary windings is positioned proximate the primary winding in at least one of the two slots.

DESCRIPTION OF DRAWINGS

Various embodiments of the invention are described herein by way of example in conjunction with the following figures.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 2:
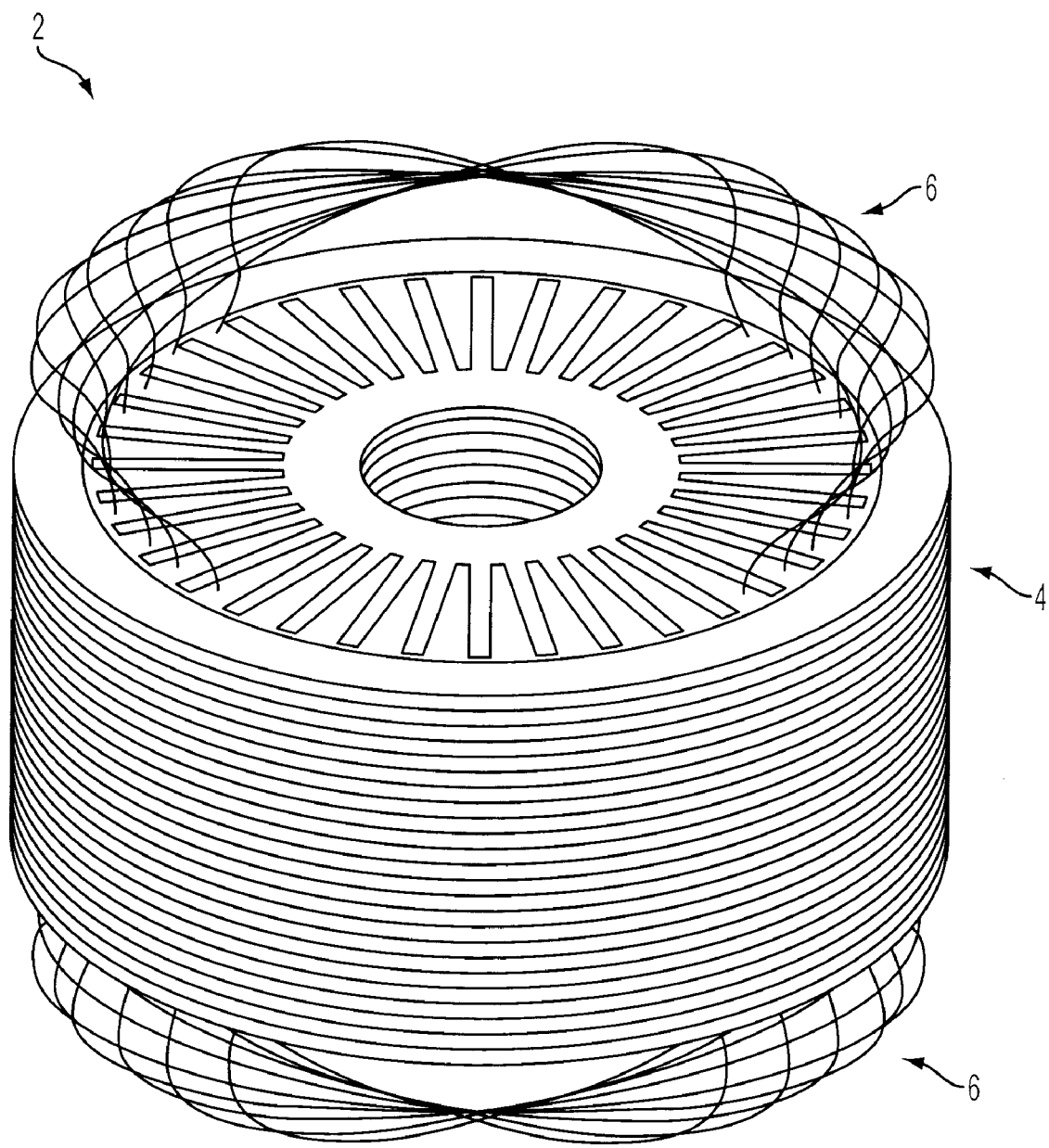
FIG. 2 illustrates various embodiments of a compact three-phase multi-winding device.

FIG. 2 illustrates various embodiments of the compact three-phase multi-winding device 2. The compact three-phase multi-winding device 2 is configured as a motor-like structure having any number of poles which is practical (e.g., two poles, four poles, six poles, etc.). The compact three-phase multi-winding device 2 may be utilized in a variety of applications. For example, the compact three-phase multi-winding device 2 may be utilized in an alternating current (AC) power supply having a plurality of power cells, in an AC drive having a plurality of power cells, or in a direct current (DC) power supply having a plurality of power cells, etc.

Various embodiments of an AC power supply having a plurality of power cells are described, for example, in U.S. Pat. No. 5,625,545 to Hammond ("the '545 patent"), which is hereby incorporated by reference in its entirety. Various embodiments of a DC power supply having a plurality of power cells are described, for example, in U.S. Pat. No. 5,638,263 to Opal et al ("the '263 patent"), which is hereby incorporated by reference in its entirety. In the context of a DC power supply, a power cell is a device which accepts three-phase AC input power, outputs a single DC voltage, and includes an AC-DC rectifier (which may be regenerative), a smoothing filter, and an output DC-to-DC converter.

Figure 1:
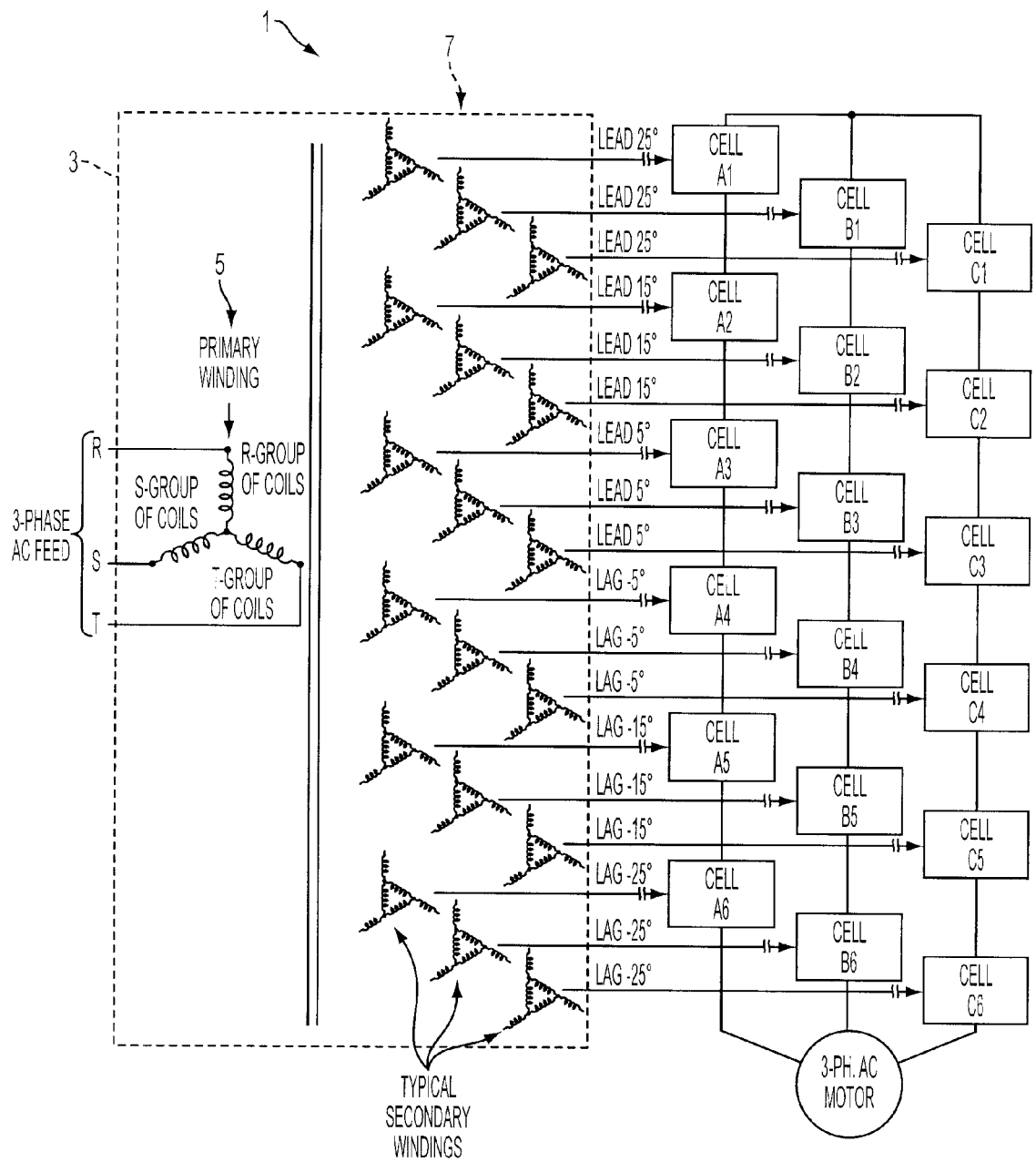
FIG. 1 illustrates an AC drive which includes a conventional three-phase transformer.

For ease of explanation purposes, the compact three-phase multi-winding device 2 will be described in the context of its use in an AC drive. However, it is appreciated that the compact three-phase multi-winding device 2 may be utilized in other applications. As shown in FIG. 1, the compact three-phase multi-winding device 2 includes a core 4 having cylindrical symmetry. It should be noted that a cylindrical shaped core is provided by way of example only, and additional geometric shapes may be used, e.g. a core with triangular symmetry. The circumference and length of the core 4 can vary by application. The compact three-phase multi-winding device 2 also includes primary windings and phase-shifted secondary windings. For purposes of clarity, portions of the windings that are positioned within the core are not fully illustrated in FIG. 2 and are illustrated simply as windings 6. The core 4 may be fabricated from any suitable material in any suitable manner. According to various embodiments, the core 4 is fabricated from a material having high magnetic permeability (e.g., steel or other ferrous material). According to various embodiments, the core 4 includes a stack of steel laminations. The laminations may be punched from rolled sheets of an electrical steel which is an alloy of iron and silicon. The primary windings and the secondary windings are distributed around the core 4, similar to the windings of an AC motor.

As occurs in an AC motor, the application of a three-phase voltage to the primary windings of the three-phase multi-winding device 2 creates a radial magnetic field, which rotates around an axis of the structure as a function of time. The rotating magnetic field induces voltages into the various winding components distributed around the core 4. For a given winding component, the phase angle of the induced voltage depends on the physical angle at which the given winding component has been installed. The high magnetic permeability of the core 4 operates to minimize the current required to generate the magnetic field. The secondary windings are positioned within the core 4 at physical angles that correspond to the desired electrical phase angle. For embodiments where the core 4 is fabricated from a magnetic material such as steel, all of the windings may be placed into slots defined by the core 4. The number of slots may be chosen so that slots are positioned at the desired physical angles.

For use in an AC drive, the windings 6 may be arranged to have any even number of poles. The even number of poles assures that each North pole in the magnetic field has a corresponding South pole. If there are two poles (one North and one South), the poles will make one full revolution around the structure for each electrical cycle, and the available increments in electrical phase angle are equal to three-hundred and sixty degrees divided by the number of slots. If there are four poles, one full revolution corresponds to two electrical cycles, and the available increments in electrical phase angle are equal to seven-hundred and twenty degrees divided by the number of slots. If there are six poles, one full revolution corresponds to three electrical cycles, and the available increments in electrical phase angle are equal to one-thousand and eighty degrees divided by the number of slots, etc.

For use in an AC drive, with the power cell arrangements in FIG. 1, the required increments in electrical phase angle may, for example, be ten degrees or multiples thereof. Therefore, if a two-pole winding is used, there may be at least thirty-six slots (i.e., 360 degrees divided by 36 slots produces 10 degree increments). If a four-pole winding is used, there may be at least seventy-two slots (i.e., 720 degrees divided by 72 slots produces 10 degree increments). If a six-pole winding is used, there may be at least one-hundred and eight slots (1080 degrees divided by 108 slots produces 10 degree increments), etc. For purposes of clarity, FIGS. 1 through 6 show the minimum number of slots (thirty-six) corresponding to ten degree angle increments with a two-pole winding. However, it will be appreciated that other numbers of poles may be utilized for various applications.

The following table shows, for various numbers of cells in an apparatus similar to the AC drive discussed above, the number of slots needed in the core, for both two-pole and six-pole designs. The two-pole design allows the smallest number of slots, but requires each slot to hold three secondary component coils. The six-pole design needs more slots, but allows each slot to hold only one secondary component coil.

| | | | | |
|---|---|---|---|---|
| Total number of cells used: | 9 | 12 | 15 | 18 |
| Total number of secondary windings: | 9 | 12 | 15 | 18 |
| Total number of secondary component coils: | 27 | 36 | 45 | 54 |
| Number of slots needed if each slot holds one component coil: | 54 | 72 | 90 | 108 |
| Number of slots needed if each slot holds three component coils: | 18 | 24 | 30 | 36 |
| Phase angle spacing in degrees needed to cancel harmonics: | 20 | 15 | 12 | 10 |
| Number of slots needed to achieve angle spacing with two poles: | 18 | 24 | 30 | 36 |
| Number of slots needed to achieve angle spacing with six poles: | 54 | 72 | 90 | 108 |

Figure 3:
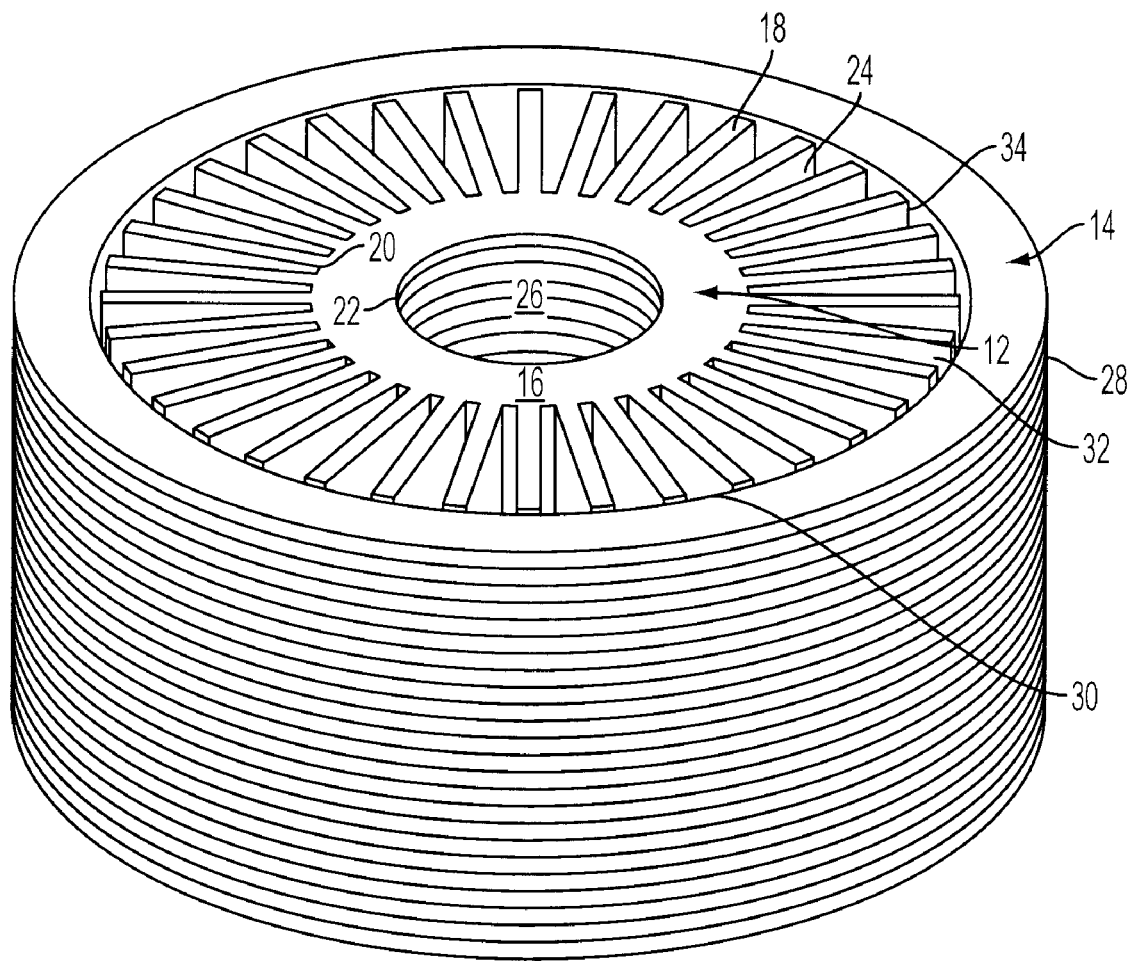
FIGS. 3 and 4 illustrate various embodiments of the core of the compact three-phase multi-winding device of FIG. 2.
Figure 4:
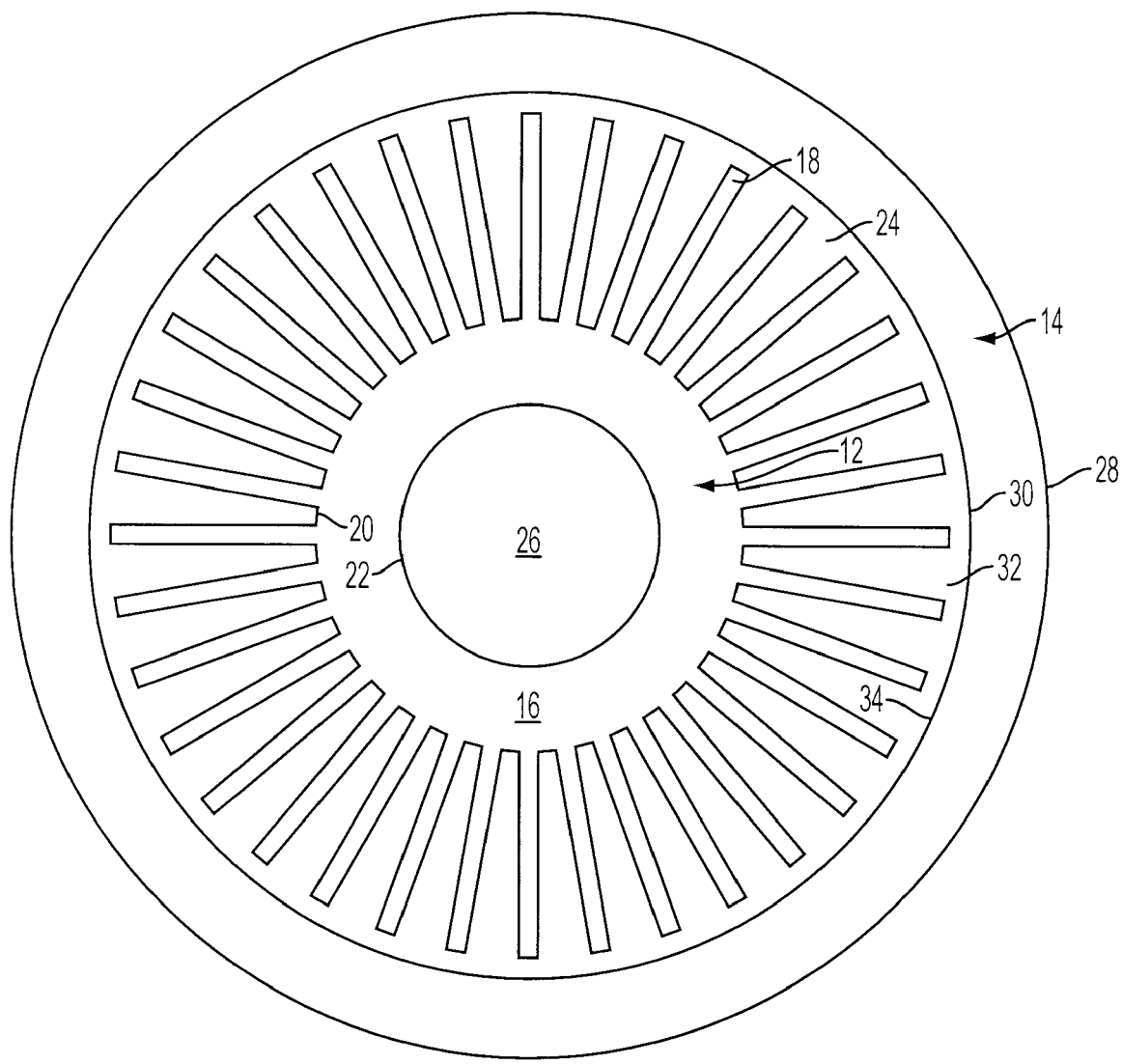

FIGS. 3 and 4 illustrate various embodiments of the core of the compact three-phase multi-winding device. The core (and hence the lamination stack if used) includes a first member 12 and a second member 14 which surrounds at least a portion of the first member 12. The first and second members 12, 14 are non-rotatable in the respect that one does not move relative to the other. The first member 12 may be considered the "inner" member and the second member 14 may be considered the "outer" member of the core. In the illustrated embodiment, the first member 12 is configured to resemble the hub and spokes of a wheel, and the second member 14 is configured to resemble the rim or outer shell of the wheel.

In FIGS. 3 and 4, the first member 12 includes a hub 16 and a plurality of spokes 18 connected to or integral with the hub 16. The hub 16 includes a first surface 20 and a second surface 22. The spokes 18 are evenly spaced about the first surface 20, and cooperate with the first surface 20 to define a plurality of slots 24 evenly spaced about the first surface 20. Although not shown in FIGS. 3 and 4 for purposes of clarity, the primary and secondary windings of the compact three-phase multi-winding device occupy the slots 24. The second surface 22 defines an opening 26 which passes through the center of the core. According to various embodiments, the hub 16 may be a solid hub (i.e., there is no opening which passes through the center of the core).

The second member, or outer shell, 14 includes a first surface 28 and a second surface 30. The first surface 28 may be considered the exterior surface of the second member 14, and the second surface 30 may be considered the interior surface of the second member 14. The second surface 30 defines an opening 32 which is sized to receive the first member 12. The opening 32 is partially covered by the first member 12 in FIGS. 3 and 4. When the first member 12 is surrounded by the second member 14, the first and second members 12, 14 define a spacing 34 therebetween (i.e., between the spokes 18 and the second surface 30 of the second member 14). According to various embodiments, the second member 14 is integral to the first member 12. For such embodiments, there is no spacing between the first and second members 12, 14.

Figure 5:
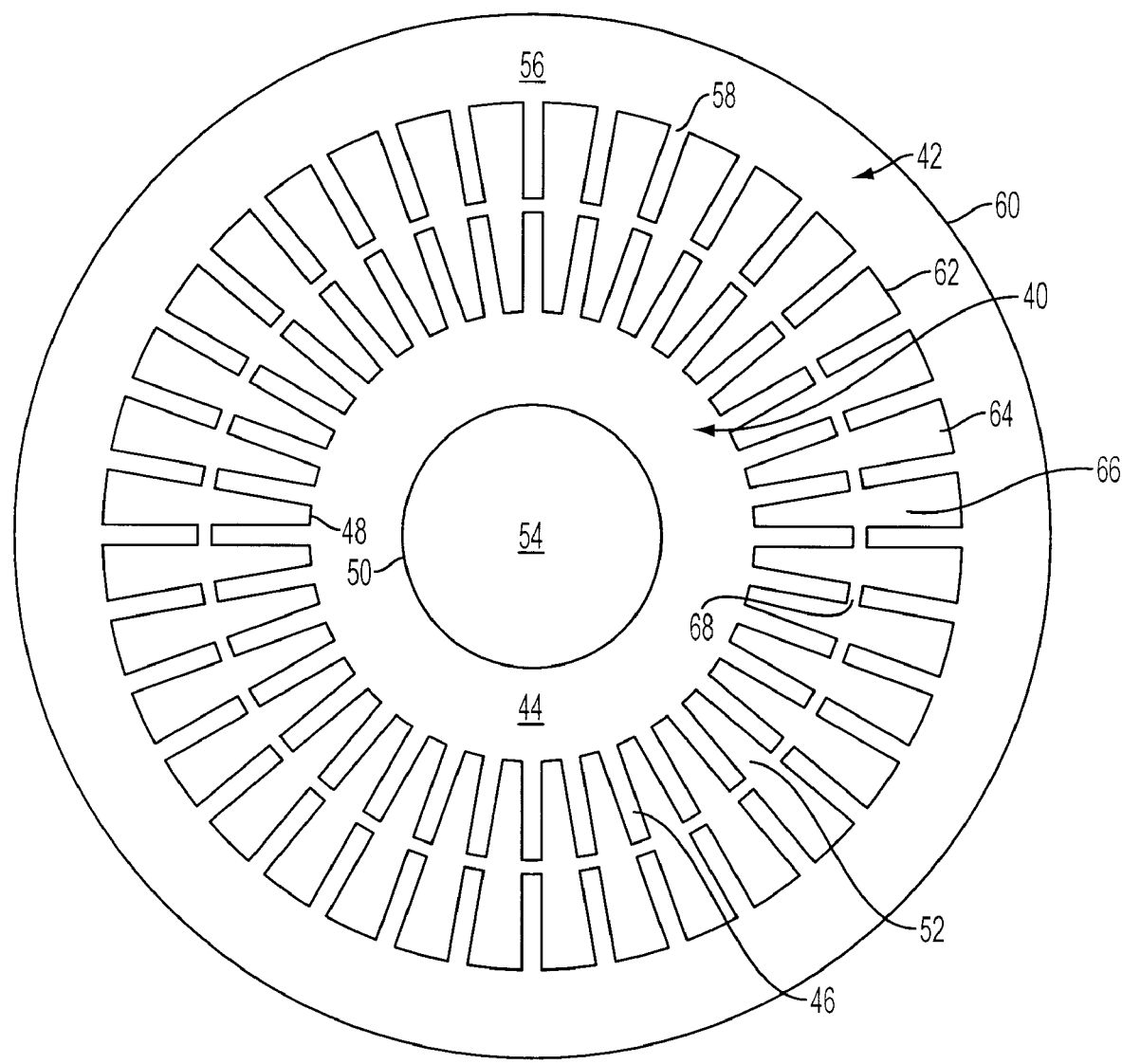
FIG. 5 illustrates other various embodiments of the core of the compact three-phase multi-winding device of FIG. 2.

FIG. 5 illustrates other various embodiments of the core of the compact three-phase multi-winding device. The core (and hence the lamination stack if used) includes a first member 40 and a second member 42 which surrounds the first member 40. The first member 40 may be considered the "inner" member and the second member 42 may be considered the "outer" member of the core.

The first member 40 includes a hub 44 and a plurality of spokes 46 connected to or integral with the hub 44. The hub 44 includes a first surface 48 and a second surface 50. The spokes 46 are evenly spaced about the first surface 48, and cooperate with the first surface 48 to define a plurality of slots 52 evenly spaced about the first surface 48. Although not shown in FIG. 5 for purposes of clarity, the primary and/or secondary windings of the compact three-phase multi-winding device occupy the slots 52. The second surface 50 defines an opening 54 which passes through the center of the core. According to various embodiments, the hub 44 may be a solid hub (i.e., there is no opening which passes through the center of the core).

The second member 42 includes a rim 56 and a plurality of spokes 58 connected to or integral with the rim 56. The rim 56 includes a first surface 60 and a second surface 62. The spokes 58 are evenly spaced about the second surface 62 and are aligned with and spaced apart from the spokes 46. Although the spokes 46, 58 are shown in FIG. 5 as being approximately equal in length, it will be appreciated that the lengths of the spokes 46 can be less than or greater than the length of the spokes 58. The spokes 58 cooperate with the second surface 62 to define a plurality of slots 64 evenly spaced about the second surface 62. Although not shown in FIG. 5 for purposes of clarity, the primary and/or secondary windings of the compact three-phase multi-winding device also occupy the slots 64. The slots 64 are aligned with the slots 52. The spokes 58 define an opening 66 which is sized to receive the first member 40. The opening 66 is partially covered by the first member 40 in FIG. 5. When the first member 40 is surrounded by the second member 42, the first and second members 40, 42 define a spacing 68 therebetween (i.e., between the spokes 46 and the spokes 58). According to various embodiments, the second member 42 is integral to the first member 40. For such embodiments, there is no spacing between the first and second members 40, 42.

Figure 6:
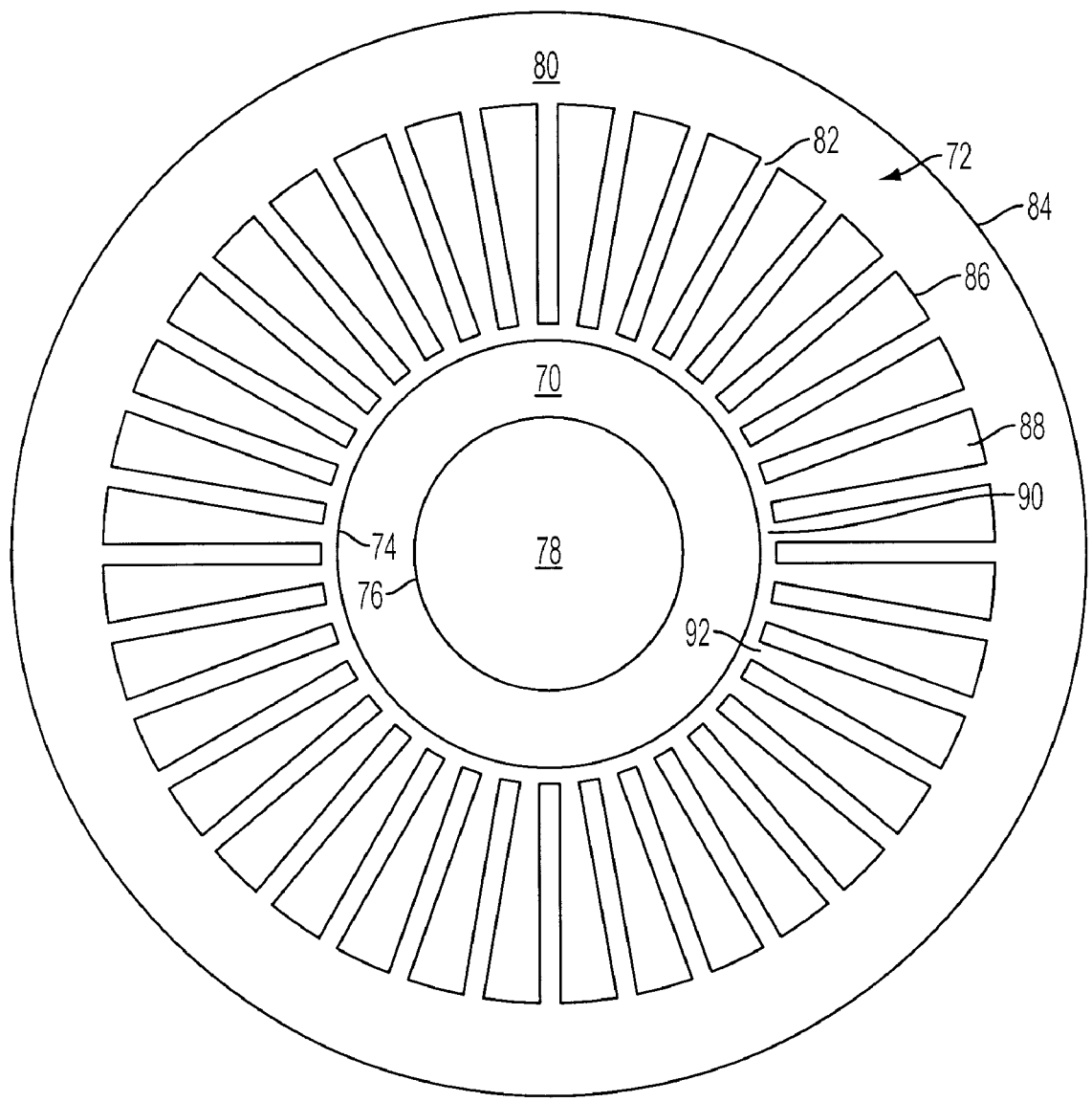
FIG. 6 illustrates yet other various embodiments of the core of the compact three-phase multi-winding device of FIG. 2.

FIG. 6 illustrates yet other various embodiments of the core of the compact three-phase multi-winding device. The core (and hence the lamination stack if used) includes a first member 70 and a second member 72 which surrounds the first member 70. The first member 70 may be considered the "inner" member and the second member 72 may be considered the "outer" member of the core.

The first member 70 includes a first surface 74 and a second surface 76. The second surface 76 defines an opening 78 which passes through the center of the core. According to various embodiments, the first member 70 may be a solid member (i.e., there is no opening which passes through the center of the core).

The second member 72 includes a rim 80 and a plurality of spokes 82 connected to or integral with the rim 80. The rim 80 includes a first surface 84 and a second surface 86. The spokes 82 are evenly spaced about and the second surface 86, and cooperate with the second surface 86 to define a plurality of slots 88 evenly spaced about the second surface 86. Although not shown in FIG. 6 for purposes of clarity, the primary and/or secondary windings of the compact three-phase multi-winding device occupy the slots 86. The spokes 82 define an opening 90 which is sized to receive the first member 70. The opening 90 is partially covered by the first member 70 in FIG. 6. When the first member 70 is surrounded by the second member 72, the first and second members 70, 72 define a spacing 92 therebetween (i.e., between the first surface 74 of the first member 70 and the spokes 82). According to various embodiments, the second member 72 is integral to the first member 70. For such embodiments, there is no spacing between the first and second members 70, 72.

For each of the embodiments shown in FIGS. 3-6, the magnetic field flows through the respective first and second members, and the primary and/or secondary windings occupy the respective slots. The primary and secondary windings may be arranged in a full-pitch or a fractional-pitch configuration. According to various embodiments, the primary windings are positioned closest to the center of the core, and the secondary windings are positioned further away from the center of the core. According to other embodiments, the secondary windings are positioned closest to the center of the core, and the primary windings are positioned further away from the center of the core. For implementations where the primary and/or secondary windings do not occupy the entire volume of the respective slots, wedges can be used to fill the remaining volume of the slots. According to various embodiments, each of the primary and secondary windings are fabricated from a conductive material (e.g., copper) and include an insulating jacket which surrounds the conductive material. The insulating jacket of the windings may provide line-to-line insulation between the primary and secondary windings, for the end turns of the windings, and between different phases of the primary. The insulating jacket may also provide line-to-ground insulation between the core and the windings to prevent a ground fault.

Figure 7:
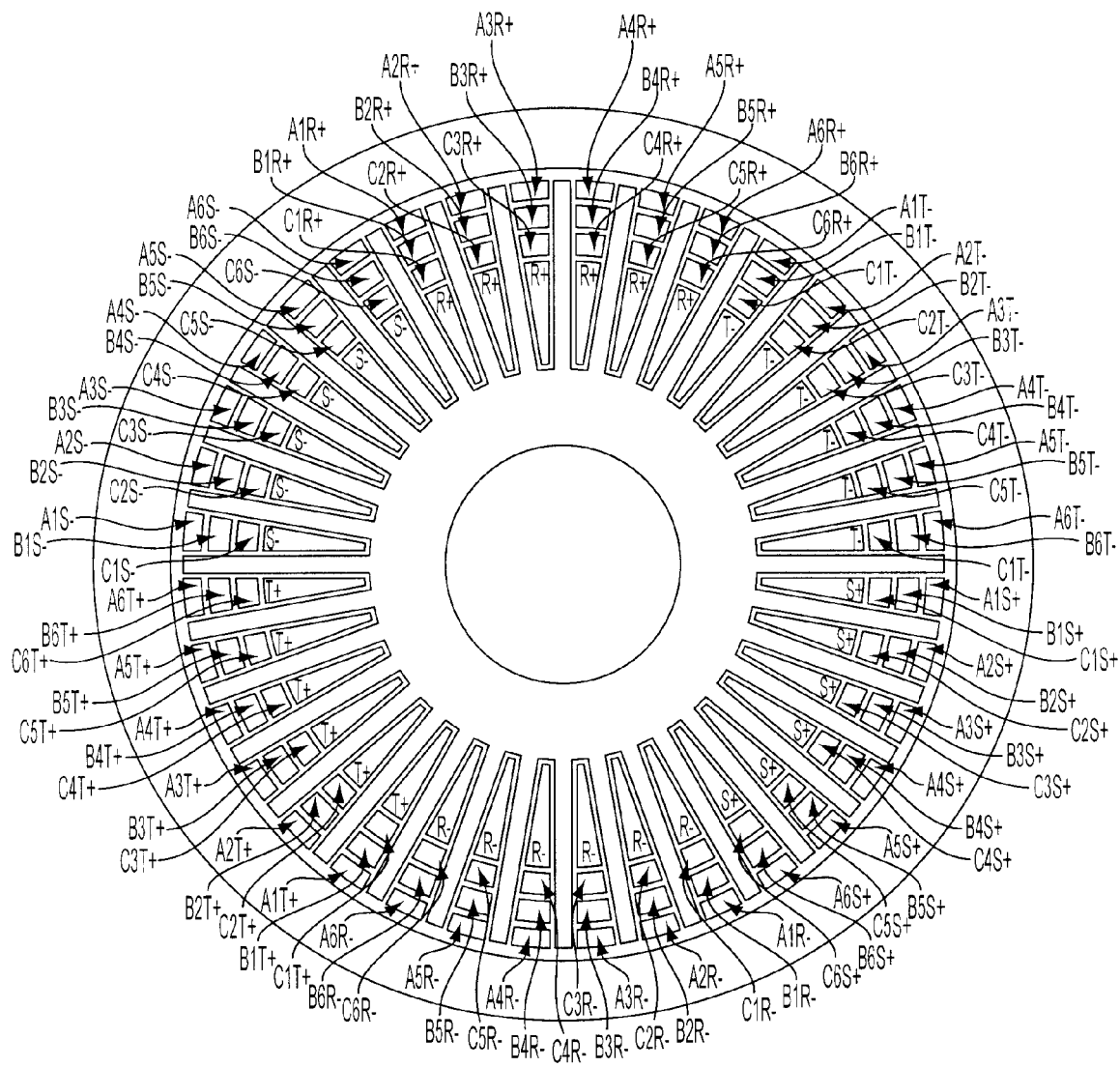
FIG. 7 illustrates yet other various embodiments of the core and windings of the compact three-phase multi-winding device of FIG. 2.

FIG. 7 illustrates various embodiments of the compact three-phase multi-winding device as used in an AC drive, with the power cell arrangement as illustrated in FIG. 1, may require angle increments of ten degrees. For purposes of simplicity and ease of understanding, the winding arrangement shown in FIG. 6 is a two-pole, full-pitch winding configuration. However, it will be appreciated that other arrangements (four pole, six pole, fractional pitch, etc.) may also be utilized.

Although FIG. 7 shows the primary winding coils installed first at the bottom of the slots (i.e., the portion of the slot closest to the center of the core represented by the letters R, S and T), the sequence of installation can vary. Each phase of the primary winding consists of six coils, which may be connected in series or parallel or any combination thereof. Each coil has one or more turns of conductor, which pass upward through one slot and return downward through another slot halfway (one pole-pitch) around the structure. The upward side of each coil is marked "+", while the downward side of each coil is marked "−". For example, in FIG. 7, the six coils for phase R are installed with the upward side ("R+") in the slots between 11 and 1 o'clock, and with the downward side (R−) in the slots between 5 and 7 o'clock. The six coils for phase S are installed with the upward side (S+) in the slots between 3 o'clock and 5 o'clock, and with the downward side (S−) in the slots between 9 o'clock and 11 o'clock. The six coils for phase T are installed with the upward side (T+) in the slots between 7 o'clock and 9 o'clock, and with the downward side (T−) in the slots between 1 o'clock and 3 o'clock. The group of six coils for each primary phase are identified as the R-group of coils, T-group of coils, and S-group of coils respectively.

Figure 8:
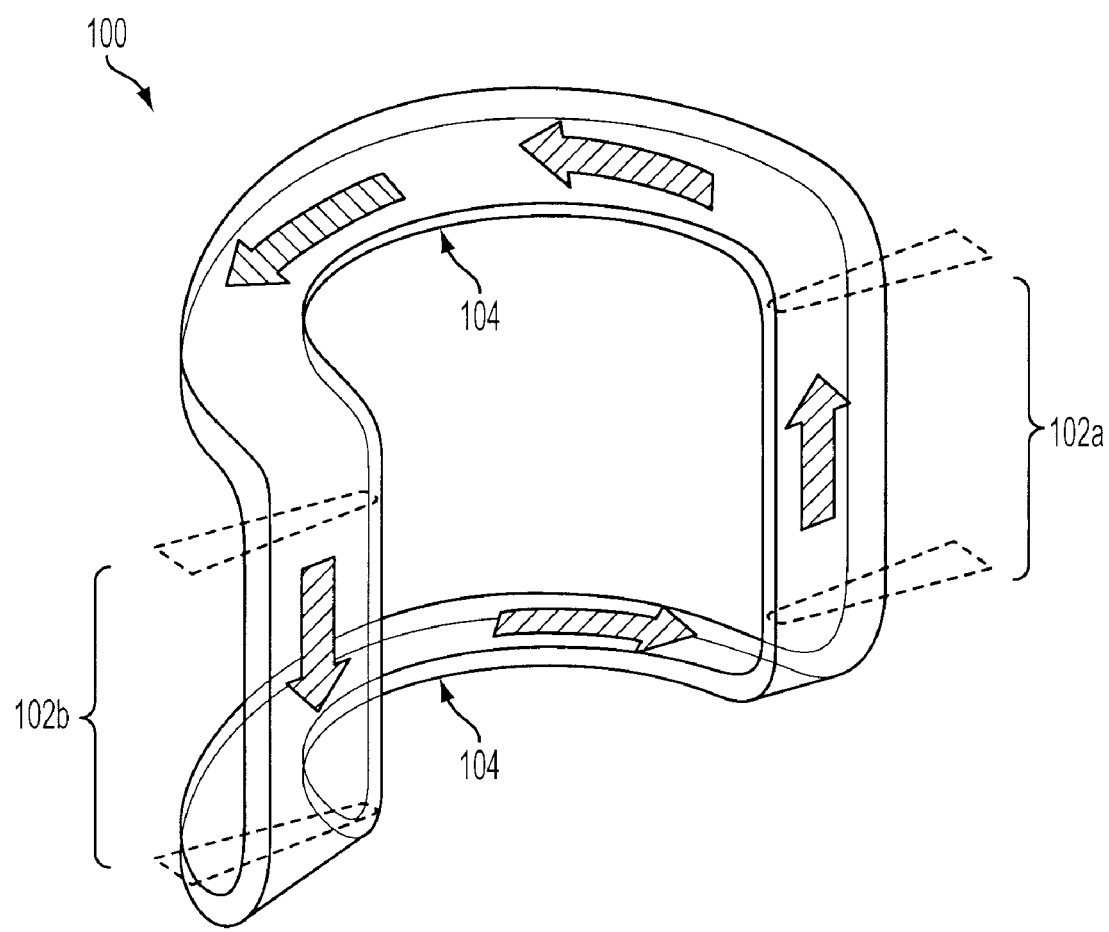
FIG. 8 illustrates a wire-frame sketch of a possible coil of the compact three-phase multi-winding device of FIG. 7.

Each secondary winding includes three coils having one or more turns of conductor, which pass upward through one slot and return downward through another slot halfway (one pole-pitch) around the structure. In FIG. 7, the secondary winding coil is represented by references starting with A, B, or C, and followed by a numeral 1, 2, 3, 4, 5 or 6. The combination of a letter and a numeral together may indicate which cell (e.g., the cells shown in FIG. 10 and discussed in detail below) is fed by that secondary winding coil. The letter identifies the phase group of the cell while the numeral identifies the rank of the cell. A sketch of a typical coil is shown in FIG. 8. In FIG. 7, the upward side of each coil is marked "+", while the downward side of each coil is marked "−". The secondary coils that are installed in the same slots as the six primary coils for phase R are designated "R component coils". The secondary coils that are installed in the same slots as the six primary coils for phase T are designated "T component coils". The secondary coils that are installed in the same slots as the six primary coils for phase S are designated "S component coils". For example, when used with a power delivery system having multiple cells (such as those shown in FIG. 10), the R component coil feeding cell C1 is installed with the upward side (C1R+) in the slot at 11:10 o'clock, and with the downward side (C1R−) in the slot at 5:10 o'clock. The R component coil feeding cell C2 is installed with the upward side (C2R+) in the slot at 11:30 o'clock, and with the downward side (C2R−) in the slot at 5:30 o'clock. The one-slot displacement between the C1R coil and the C2R coil generates a ten degree phase angle between them.

In a similar manner, the T component coil feeding cell C1 is installed with the upward side (C1T+) in the slot at 7:10 o'clock, and with the downward side (C1T−) in the slot at 1:10 o'clock. The T component coil feeding cell C2 is installed with the upward side (C2T+) in the slot at 7:30 o'clock, and with the downward side (C2T−) in the slot at 1:30 o'clock. The one-slot displacement between the C1T coil and the C2T coil generates a ten degree phase angle between them.

Continuing the pattern, the S component coil feeding cell C1 is installed with the upward side (C1S+) in the slot at 3:10 o'clock, and with the downward side (C1S−) in the slot at 9:10 o'clock. The S component coil feeding cell C2 is installed with the upward side (C2S+) in the slot at 3:30 o'clock, and with the downward side (C2S−) in the slot at 9:30 o'clock. The one-slot displacement between the C1S coil and the C2S coil generates a ten degree phase angle between them.

Because the application an AC drive requires the same phase angle to be repeated in three separate secondary windings (e.g., for the three power cells in a given rank), FIG. 7 shows that each slot contains component coils for three secondary windings. For example, cells A1, B1, and C1 require the same phase angle, and therefore coils A1R and B1R are in the same slots as coil C1R, coils A1T and B1T are in the same slots as coil C1T, and coils A1S and B1S are in the same slots as coil C1S.

Although FIG. 7 illustrates a two-pole configuration with thirty-six slots, it is understood that, according to other embodiments, other pole/slot configurations may be utilized. In certain implementations, utilizing an increased number of poles can provide certain advantages. With two poles the entire magnetic flux flows halfway (one pole-pitch) around the core, and therefore the steel in the first and second members must be sized accordingly. By utilizing a six pole configuration, only one-third of the entire magnetic flux flows sixty degrees (one pole-pitch) around the core, allowing the steel in the first and second members to be reduced by approximately two-thirds. With two poles the end-turns of each coil need to be long enough to pass halfway (one pole-pitch) around the core. For example, with an AC drive requiring angle increments of ten degrees and having a six-pole configuration, the end-turns only need to pass sixty degrees (one pole-pitch) around the core, saving conductor material and reducing lost power. In certain implementations, utilizing an increased number of slots can provide certain advantages. With thirty-six slots, component coils for each of three secondary windings are placed into each slot, in addition to a component coil from the primary winding. With one-hundred and eight slots, only one component coil for a given secondary winding needs to occupy each slot, which allows the insulation between the secondary coils to be reduced.

FIG. 8 illustrates a wire-frame sketch of a coil 100 of the compact three-phase multi-winding device of FIG. 7. Portions of the coil are installed into two slots of the core (e.g., passing upward through slot 102a and downward through 102b as shown in FIG. 7), for example, as shown in FIG. 2. The remaining portions of the coil include end-turns 104 where the conductors pass from one slot to the other. Because the end-turns 104 do not interact with the rotating magnetic field in the core material, they do not contribute to the secondary winding voltage, but they still carry current and therefore have power losses. In FIG. 8 dotted lines indicate the slot openings for slots 102a and 102b, but it should be understood that there are typically at least two coils in each slot (one for a primary and one for a secondary), so that the coil cross-section area is smaller than the slot cross-section area. As described hereinabove, according to various embodiments, there may be coils for more than one primary (e.g., two) and/or more than one secondary (e.g., three) in a given slot.

Figure 9:
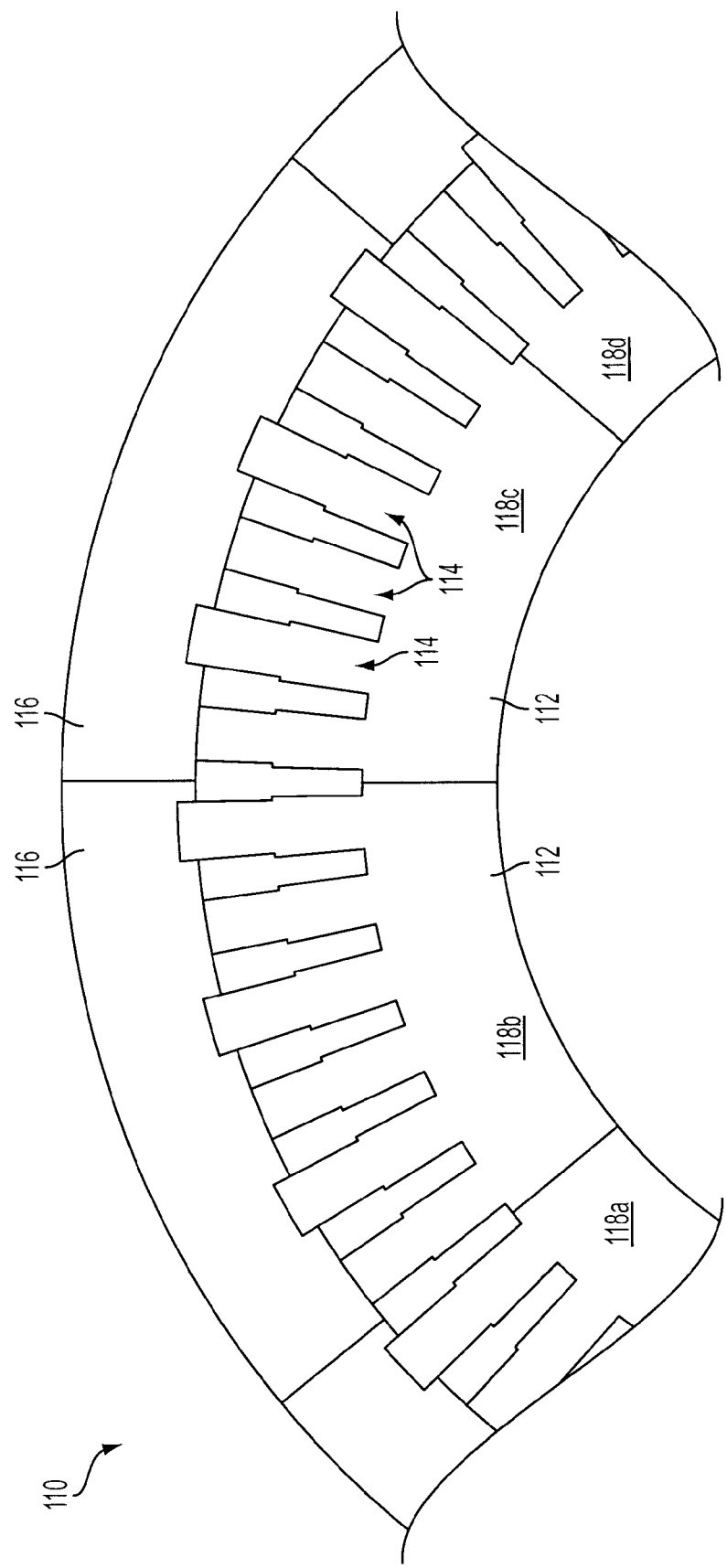
FIG. 9 illustrates various embodiments of core construction for the compact three-phase multi-winding device of FIG. 2.

FIG. 9 illustrates a cross section of part of one layer 110 of an alternately constructed core. Here, inner member 16 is assembled from segments 112 having a series of integrated spokes or extensions 114 of varying lengths. The outer member 14 is similarly assembled from segments 116. In the example illustrated in FIG. 9, each alternate spoke 114 is either long or short when compared to its immediately neighboring spokes. Outer shell segments 116 are configured to accept each spoke accordingly. Each layer of the core is constructed similar to layer 110, however during assembly, each layer is rotated at least one spoke, such that a shorter spoke sits on top of a longer spoke, creating an inter-leaved pattern of the spokes when construction of the core is completed. By providing an interleaved pattern, any resulting air gaps during construction (specifically those created during the connections of the outer shell 116 to the spokes 114) is eliminated, or greatly reduced. Any air gaps between the segments are also reduced or eliminated by this interleaving process. Further advantages are that for a large core the segments may be easier to punch resulting in less scrap material, and may be easier to handle than fully circular lamentations.

Similarly, each layer of the core may be made of a number of segments (e.g., 9 segments), placed next to each other to form a single layer. In layer 110 illustrated in FIG. 9, 4 segments 118a, 118b, 118c and 118d are shown. During construction of the core, when the separate layers are stacked, any seams created by the segmented portions (e.g., the seam between 118a and 118b) are covered by a segment in the upper and lower layers, resulting in an inter-leaved pattern for the segment seams.

Figure 10:
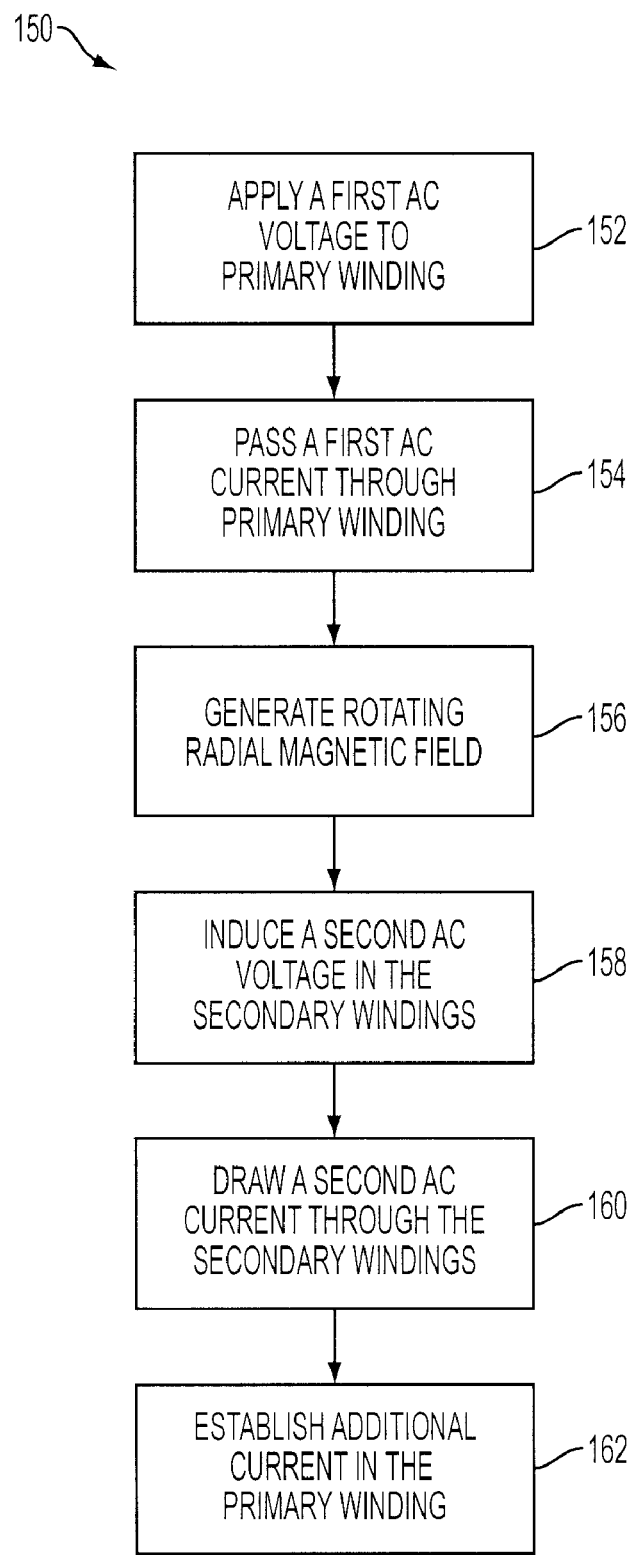
FIG. 10 illustrates various embodiments of a method for generating AC voltages at specified phase angles.

FIG. 10 illustrates various embodiments of a method 150 for generating voltages at specified phase angles. The method 150 may be implemented by the compact three-phase multi-winding device described hereinabove. For ease of explanation purposes, the method 150 will be described in the context of its implementation by the compact three-phase multi-winding device.

The process starts at block 152, where a three-phase AC voltage is applied to the primary winding of the compact three-phase multi-winding device. The three-phase AC voltage may be applied across the R-group of coils, the S-group of coils, and the T-group of coils of the primary winding. As described hereinabove, the R-group of coils, the S-group of coils, and the T-group of coils comprise various turns of conductors having "upward" and "downward" sides placed in the slots about the compact three-phase multi-winding device.

From block 152, the process advances to block 154, where an AC current (e.g., magnetizing current) passes through the various turns of conductors which comprise the primary winding. From block 154, the process advances to block 156, where the AC current passing through the primary winding creates an AC magnetic flux in the core of the compact three-phase multi-winding device. Stated differently, the AC current passing through the primary winding magnetizes the core of the compact three-phase multi-winding device. Due to the arrangement of the turns of conductor about the core, the created magnetic field is a radial magnetic field which rotates around an axis of symmetry (e.g., a longitudinal axis) defined by the core. In contrast to an AC motor, in which part of the structure (e.g., the rotor) rotates along with the rotating magnetic field, no part of the structure of the three-phase multi-winding device rotates.

From block 156, the process advances to block 158, where an AC voltage is induced in the secondary windings of the compact three-phase multi-winding device by the rotating magnetic field. In general, the induced AC voltage is usually less than the AC voltage applied to the primary winding. As described hereinabove, each secondary winding comprises various turns of conductors having "upward" and "downward" sides placed in the slots about the compact three-phase multi-winding device. Due to the structure and arrangement of the compact three-phase multi-winding device, various embodiments of the device can be configured such that the respective secondary windings provide specific AC voltages at specific phase angles.

According to various embodiments, the process may advance from block 158 to block 160, where a current is drawn through the secondary windings. The current may be drawn by a load (e.g., a power cell) connected to the secondary windings. From block 160, the process may advance to block 162, where additional current is established in the primary winding to cancel any ampere-turns of the secondary current.

Figure 11:
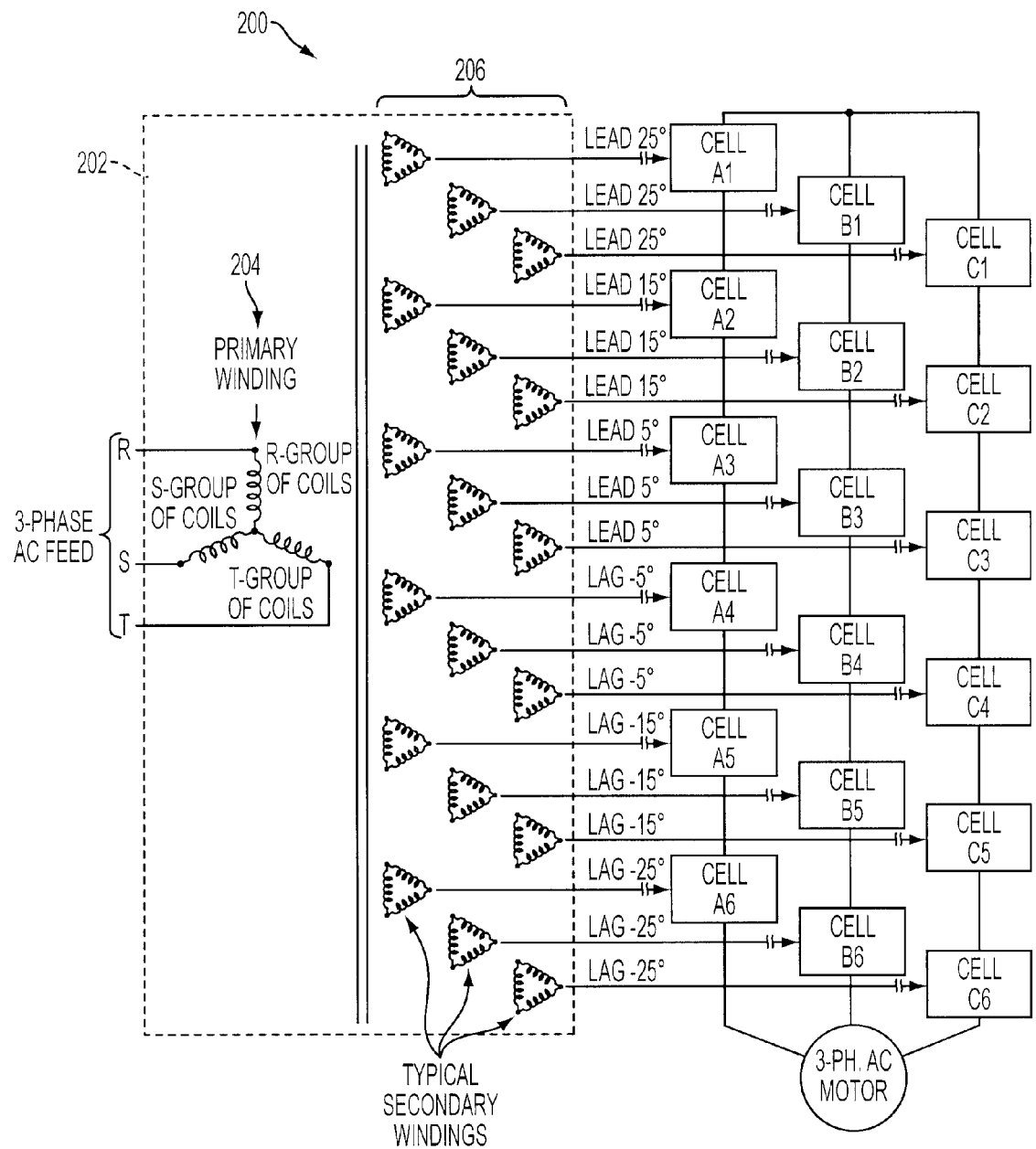
FIG. 11 illustrates various embodiments of an apparatus which includes a compact three-phase multi-winding device.

FIG. 11 illustrates various embodiments of an apparatus 200 which includes a compact three-phase multi-winding device 202. The apparatus may be embodied as a power supply, as a DC drive, as an AC drive as shown in FIG. 11, etc. The compact three-phase multi-winding device 202 may perform the same function as a conventional transformer, requires less space, and can more accurately realize the desired phase angles and voltages without having to utilize multiple component windings.

As shown in FIG. 11, the various secondary windings 206 of the compact three-phase multi-winding device 202 may utilize simple delta connections (with no extensions). According to other embodiments, the secondary windings 206 may utilize simple wye connections in lieu of the simple delta connections. Unlike a conventional transformer, the various secondary windings 206 of the compact three-phase multi-winding device 206 have only one component winding from each phase group, all with identical turn numbers, and with identical coupling coefficients to the primary winding 204. It should be noted although FIG. 11 shows that the primary winding is wye-connected, it is appreciated that the primary winding could be connected in other arrangements (e.g., delta-connected).

While several embodiments of the invention have been described herein by way of example, those skilled in the art will appreciate that various modifications, alterations, and adaptions to the described embodiments may be realized without departing from the spirit and scope of the invention defined by the appended claims. For example, according to certain embodiments, the compact three-phase multi-winding device can be configured to provide the functionality of two separate transformers at one-half power, three separate transformers at one-third power, etc.

By utilizing the motor-like structure described herein, the three-phase multi-winding device can be constructed with less material and less labor, and within a smaller footprint. Additionally, the secondaries can be constructed to provide more accurate phase shift angles and specified voltages.

What is claimed is:

1. A three-phase, multi-winding device, comprising:
   a core comprising
      a hub,
      an outer shell around a perimeter of the hub, wherein the hub and the outer shell are in a fixed position with respect to each other, and
      a plurality of slots;
   a primary winding comprising a plurality of coils, wherein each of the plurality of coils is positioned in at least two of the slots; and
   a plurality of spatially distributed secondary windings, wherein a first secondary winding and a second secondary winding are positioned proximate a first coil of the primary winding in at least two of the slots.

2. The multi-winding device of claim 1, wherein the slots are sized to accept a plurality of windings and arranged to position at least a portion of the accepted windings between the hub and the outer shell.

3. The multi-winding device of claim 2, wherein the hub and the outer shell define a spacing therebetween.

4. The multi-winding device of claim 1, wherein the core further comprises a plurality of spokes.

5. The multi-winding device of claim 4, wherein the hub and outer shell are connected via the plurality of spokes, and the slots are defined by the hub, shell and spokes.

6. The multi-winding device of claim 4, wherein the plurality of spokes extend from the hub toward the shell, and the slots are defined by the hub, shell and spokes.

7. The multi-winding device of claim 4, wherein the plurality of spokes extend from the shell toward the hub, and the slots are defined by the hub, shell and spokes.

8. The multi-winding device of claim 1, wherein the plurality of slots are integral with either the hub, the shell, or a combination of both the hub and the shell.

9. The multi-winding device of claim 1, wherein at least a portion of the core is constructed from a plurality of interleaved layers.

10. The multi-winding device of claim 1, wherein each of the plurality of slots contains a primary winding and a plurality of secondary windings, wherein the secondary windings have unique phases.

11. A method for generating AC voltages at specified phase angles, the method comprising:
   applying a first AC voltage to a stationary primary winding of a three-phase multi-winding device;
   passing an AC current through the primary winding;
   generating a radial magnetic field which rotates around an axis of symmetry defined by a core of the three-phase multi-winding device; and
   inducing a second AC voltage in a plurality of stationary spatially distributed secondary windings of the three-phase multi-winding device, wherein a first secondary winding and a second secondary winding are positioned proximate a first coil of the (primary winding in at least two slots the three-phase multi-winding device.

12. The method of claim 11, wherein the mufti-winding device comprises:
   a core comprising:
      a hub,
      an outer shell around a perimeter of the hub, wherein the hub and the outer shell are in a fixed position with respect to each other, and
      a plurality of slots;
   a primary winding positioned in at least two of the slots; and
   the plurality of spatially distributed secondary windings.

13. The method of claim 12, wherein the core of said multi-winding device further comprises a plurality of spokes, and the slots are defined by the hub, shell and spokes.

14. The method of claim 13, wherein the spokes carry the radial magnetic field around the axis of symmetry.

15. The method of claim 13, wherein the slots are sized to accept a plurality of windings and arranged to position at least a portion of the accepted windings between the hub and the outer shell.

16. An apparatus, comprising:
   a plurality of power cells; and
   a multi-winding device connected to each of the power cells, wherein the multi-winding device comprises:
      a core comprising:
         a hub,
         an outer shell around a perimeter of the hub, wherein the hub and the outer shell are in a fixed position with respect to each other, and
         a plurality of slots;
      a primary winding comprising a plurality of coils, wherein each of the plurality of coils is positioned in at least two of the slots; and
      a plurality of spatially distributed secondary windings, wherein a first secondary winding and a second secondary winding are positioned proximate a first coil of the primary winding in at least two of the slots.

17. The apparatus of claim 16, wherein the slots are sized to accept a plurality of windings and arranged to position at least a portion of the accepted windings between the hub and the outer shell.

18. The apparatus of claim 17, wherein the hub and the outer shell define a spacing therebetween.

19. The apparatus of claim 16, wherein the core further comprises a plurality of spokes.

* * * * *